US012738496B2

(12) United States Patent
Kim et al.

(10) Patent No.: US 12,738,496 B2
(45) Date of Patent: Sep. 15, 2026

(54) NEGATIVE ELECTRODE AND SECONDARY BATTERY INCLUDING THE SAME

(71) Applicant: LG ENERGY SOLUTION, LTD., Seoul (KR)

(72) Inventors: Hyun Chul Kim, Daejeon (KR); Sang Wook Woo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 588 days.

(21) Appl. No.: 18/020,325

(22) PCT Filed: Sep. 16, 2021

(86) PCT No.: PCT/KR2021/012729
§ 371 (c)(1),
(2) Date: Feb. 8, 2023

(87) PCT Pub. No.: WO2022/060138
PCT Pub. Date: Mar. 24, 2022

(65) Prior Publication Data

US 2023/0223535 A1 Jul. 13, 2023

(30) Foreign Application Priority Data

Sep. 18, 2020 (KR) ........................ 10-2020-0120429

(51) Int. Cl.
*H01M 4/583* (2010.01)
*H01M 4/02* (2006.01)
*H01M 4/04* (2006.01)
*H01M 4/62* (2006.01)
*H01M 50/46* (2021.01)

(52) U.S. Cl.
CPC ......... *H01M 4/583* (2013.01); *H01M 4/0404* (2013.01); *H01M 4/625* (2013.01); *H01M 50/46* (2021.01); *H01M 2004/021* (2013.01); *H01M 2004/027* (2013.01)

(58) Field of Classification Search
CPC ..................................................... H01M 4/583
See application file for complete search history.

(56) References Cited

U.S. PATENT DOCUMENTS

2015/0155557 A1* 6/2015 Kwon .................. H01M 4/587 264/604
2015/0243989 A1 8/2015 Yamada et al.
2019/0081321 A1 3/2019 Oh et al.
2019/0115585 A1 4/2019 Tsujiko et al.
2020/0266443 A1 8/2020 Liu et al.
2021/0017028 A1 1/2021 Li et al.
2021/0167398 A1 6/2021 Choi et al.
2022/0069303 A1* 3/2022 Okamura .............. H01M 4/625
2022/0077451 A1 3/2022 Piao et al.
2022/0115667 A1 4/2022 Choi et al.

FOREIGN PATENT DOCUMENTS

CN 108063229 A 5/2018
EP 4131498 A1 * 2/2023 ............ H01M 4/133
JP 4403327 B2 1/2010
JP 2011-60465 A 3/2011
JP 2014-60148 A 4/2014
JP 2015-53291 A 3/2015
JP 2019-75199 A 5/2019
JP 2020-510972 A 4/2020
KR 10-2005-0100505 A 10/2005
KR 10-2013-0058466 A 6/2013
KR 10-2014-0140952 A 12/2014
KR 10-2019-0029187 A 3/2019
KR 10-2020-0019005 A 2/2020
KR 10-2020-0088237 A 7/2020
KR 10-2020-0092371 A 8/2020
WO WO 2020/107927 A1 6/2020
WO WO 2020/110943 A1 6/2020
WO WO 2020/148922 A 7/2020
WO WO 2020/149681 A1 7/2020

OTHER PUBLICATIONS

International Search Report (PCT/ISA/210) issued in PCT/KR2021/012729, dated Dec. 30, 2021.
Supplementary European Search Report for European Application No. 21869760.5, dated Mar. 15, 2024.

* cited by examiner

*Primary Examiner* — Brian R Ohara
(74) *Attorney, Agent, or Firm* — Birch, Stewart, Kolasch & Birch, LLP

(57) ABSTRACT

A negative electrode including: a negative electrode current collector; and a negative electrode active material layer on at least one surface of the negative electrode current collector. The negative electrode active material layer includes a negative electrode active material, wherein the negative electrode active material includes natural graphite particles, and has a particle strength of 40 MPa to 200 MPa when being plastically deformed.

5 Claims, No Drawings

NEGATIVE ELECTRODE AND SECONDARY BATTERY INCLUDING THE SAME

CROSS-REFERENCE TO RELATED APPLICATIONS

This application claims the benefit of Korean Patent Application No. 10-2020-0120429, filed on Sep. 18, 2020, in the Korean Intellectual Property Office, the disclosure of which is incorporated herein in its entirety by reference.

TECHNICAL FIELD

The present invention relates to a negative electrode and a secondary battery including the same.

BACKGROUND ART

Rising prices of energy sources due to fossil fuel depletion and ever-growing awareness of environmental pollution have driven eco-friendly alternative energy sources to be placed as a first priority for life in the future.

In particular, the demand for secondary batteries as an eco-friendly alternative energy source is sharply increasing as mobile device technology continues to develop and the demand for the mobile devices continues to increase.

On top of that, in recent years, growing concern over environmental issues has given rise to extensive research into electric vehicles (EV) and hybrid electric vehicles (HEV), which may replace vehicles powered by fossil fuels, such as gasoline vehicle and diesel vehicle, one of the main culprits for air pollution. Lithium secondary batteries having high energy density, high discharge voltage, and high output stability have been predominantly studied and applied as power sources for these electric vehicles (EV) and hybrid electric vehicles (HEV).

In the secondary batteries, lithium metal has been typically used as a negative electrode, but due to a battery short circuit caused by formation of dendrites and risk of explosion resulting therefrom, carbon-based active materials, which serve to reversibly intercalate and deintercalate lithium ions and maintain structural and electrical properties have emerged as a replacement.

Various types of carbon-based active materials, such as artificial graphite, natural graphite, and hard carbon, have been used as the carbon-based active materials, and, among these materials, a graphite-based active material, which may ensure life characteristics of lithium secondary batteries due to excellent reversibility, has been most widely used. Since the graphite-based active material has a low discharge voltage versus lithium of −0.2 V, a battery using the graphite-based active material may exhibit a high discharge voltage of 3.6 V, and thus, the graphite-based active material provides a number of benefits in regards to energy density of lithium batteries.

Among the carbon-based active materials, natural graphite, in particular, is known to exhibit higher output and capacity than other carbon-based active materials such as artificial graphite. However, the natural graphite generally has a low particle strength, and accordingly, causes internal deformation of particles upon rolling involved in the manufacture of a negative electrode, and reduces porosity inside the natural graphite or the negative electrode, thereby leading to deterioration in the diffusion rate of lithium ions and output characteristics.

Therefore, in the application of natural graphite to the negative electrode, there is a need for developing a negative electrode enabling high output.

Japanese Patent No. 4403327 discloses graphite powder for a negative electrode of a lithium ion secondary battery, but does not provide an alternative to the above-described tasks.

RELATED ART DOCUMENT

Patent Document

Japanese Patent No. 4403327.

DISCLOSURE OF THE INVENTION

Technical Problem

An aspect of the present invention provides a negative electrode with high output characteristics and high temperature storage performance.

Another aspect of the present invention provides a method for manufacturing the negative electrode described above.

Another aspect of the present invention provides a secondary battery including the negative electrode described above.

Technical Solution

According to an aspect of the present invention, there is provided a negative electrode including: a negative electrode current collector; and a negative electrode active material layer on the negative electrode current collector, wherein the negative electrode active material includes a negative electrode active material, wherein the negative electrode active material includes natural graphite particles, and has a particle strength of 40 MPa to 200 MPa when being plastically deformed.

In addition, according to another aspect of the present invention, there is provided a secondary battery including the above-described negative electrode; a positive electrode facing the negative electrode; a separator disposed between the negative electrode and the positive electrode; and an electrolyte.

Advantageous Effects

A negative electrode of the present invention includes a negative electrode active material containing natural graphite particles and having a specific range of particle strength when being plastically deformed. The negative electrode active material has a desirable level of particle strength upon plastic deformation, and accordingly, internal deformation of the active material in the negative electrode may be prevented and pores of natural graphite may be maintained. Therefore, in the negative electrode according to the present invention, the excellent capacity characteristics of the natural graphite particles may well be presented, reduction in the diffusion path of lithium may be prevented, and the output characteristics and high temperature storage performance of the negative electrode and a secondary battery may be enhanced.

MODE FOR CARRYING OUT THE INVENTION

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include", "comprise", or "have" when used in this specification, specify the presence of stated features, numbers, steps, elements, or combinations thereof, but do not preclude the presence or addition of one or more other features, numbers, steps, elements, or combinations thereof.

The term "average particle diameter ($D_{50}$)" as used herein may be defined as a particle diameter at a cumulative volume of 50% in a particle size distribution curve of particles. The average particle diameter ($D_{50}$), for example, may be measured by using a laser diffraction method. The laser diffraction method may generally measure a particle diameter ranging from a submicron level to a few mm, and may obtain highly repeatable and high-resolution results.

Hereinafter, the present invention will be described in more detail.

Negative Electrode

The present invention relates to a negative electrode, and particularly, to a negative electrode for a lithium secondary battery.

Specifically, the negative electrode includes a negative electrode current collector, and a negative electrode active material layer disposed on the negative electrode current collector and including a negative electrode active material, wherein the negative electrode active material includes natural graphite particles, and has a particle strength of 40 MPa to 200 MPa when being plastically deformed.

Typically, it is known that natural graphite particles have an excellent capacity compared to artificial graphite particles, but have a low particle strength. In general, the negative electrode requires the involvement of a rolling process in forming a negative electrode active material layer on the negative electrode current collector, and the rolling process causes internal deformation of the particles and reduces porosity in the negative electrode when typical natural graphite particles are used as a negative electrode active material. Accordingly, the negative electrode using typical natural graphite particles as an active material fails to exhibit excellent capacity characteristics of natural graphite particles, and has a capacity decrease at high output due to reduction in the diffusion path of lithium.

In order to overcome such limitations, the negative electrode of the present invention includes a negative electrode active material containing natural graphite particles and having the above-described range of particle strength when being plastically deformed. The negative electrode active material has a desirable level of particle strength upon plastic deformation, and accordingly, internal deformation of the active material may be prevented and porosity of natural graphite may be maintained even when rolling is performed in the manufacture of a negative electrode. Therefore, in the negative electrode according to the present invention, the excellent capacity characteristics of the natural graphite particles may well be presented, reduction in the diffusion path of lithium may be prevented, and the output characteristics and high temperature storage performance of the negative electrode and a secondary battery may be enhanced.

A negative electrode current collector generally used in the art may be used without limitation as the negative electrode current collector, and, for example, the negative electrode current collector is not particularly limited so long as it has high conductivity without causing adverse chemical changes in the lithium secondary battery. For example, the negative electrode current collector may include at least one selected from copper, stainless steel, aluminum, nickel, titanium, fired carbon, and an aluminum-cadmium alloy, preferably, copper.

The negative electrode current collector may have fine irregularities on the surface thereof to improve the bonding strength of a negative electrode active material, and the negative electrode current collector may be used in various shapes such as a film, a sheet, a foil, a net, a porous body, a foam body, and a non-woven fabric body.

The negative electrode current collector generally may have a thickness of 3 μm to 500 μm.

The negative electrode active material layer is disposed on the negative electrode current collector.

The negative electrode active material includes natural graphite particles. In general, natural graphite particles contain more pores than artificial graphite particles, and thus have high output characteristics. Meanwhile, the natural graphite particles according to the present invention have a high level of particle strength upon plastic deformation, as will be described later, and thus, the internal deformation in the negative electrode is prevented and a pore structure in the negative electrode is maintained to effectively ensure the diffusion path of lithium, and to enhance output characteristics and high temperature storage characteristics.

The negative electrode active material may further include, in addition to natural graphite particles, a carbon coating layer on a surface of the natural graphite particles. The carbon coating layer may contribute to enhancing structural stability of the natural graphite particles, increasing particle strength, and preventing side reactions between the negative electrode active material and an electrolyte solution.

The carbon coating layer may be present in an amount of 1 wt % to 15 wt %, preferably, 2 wt % to 5 wt % in the negative electrode active material. The presence of the carbon coating layer may improve the particle strength of the negative electrode active material, but since there is a concern that excessive formation of the carbon coating layer rather causes reduction of pores inside the negative electrode active material to increase the diffusion resistance of lithium ions, and deterioration in thermal stability and output characteristics due to an increase in electrolyte side reactions, it is desirable to form the carbon coating layer within the above-described amount range.

The carbon coating layer may include amorphous carbon. For example, the carbon coating layer may be formed by providing at least one carbon coating layer precursor selected from the group consisting of coal-tar pitch, rayon, and polyacrylonitrile-based resin to the natural graphite particles, and then heat-treating the obtained. The heat treatment for the forming of the carbon coating layer may be performed at 900° C. to 1,500° C. in terms of promoting uniform formation of the carbon coating layer.

The negative electrode active material has a particle strength of 40 MPa to 200 MPa when being plastically deformed. The negative electrode active material according to the present invention has a particle strength range described above upon plastic deformation to maintain a pore structure without internal deformation of the negative electrode active material in the negative electrode, thereby reducing the lithium ion diffusion resistance of the negative electrode, improving output characteristics and high temperature storage performance thereof.

When the negative electrode active material has a particle strength of less than 40 MPa upon plastic deformation, the internal deformation of the negative electrode active material becomes significant in a rolling process essentially involved in manufacturing the negative electrode, and accordingly, the internal pores of the negative electrode are reduced to remarkably deteriorate output characteristics, and lithium ions are not effectively diffused to lead to Li-plating, thereby causing a concern over life characteristics and storage performance. When the negative electrode active material has a particle strength of greater than 200 MPa upon plastic deformation, particle breakage may occur due to contact or collision of particles upon rolling of the negative electrode to cause deterioration of the pore structure in the negative electrode, and thus the output characteristics of lithium may be impaired.

The negative electrode active material may have a particle strength of preferably 70 MPa to 150 MPa, more preferably 90 MPa to 130 MPa upon plastic deformation, and within the range described above, the structural deformation of the active material may be prevented and the pore structure may be maintained, and particle breakage caused by contact of particles may be prevented as well, and thus the output characteristics and lifespan characteristics of the negative electrode may be remarkably improved.

The above-described particle strength of the negative electrode active material upon plastic deformation may be implemented by, in the manufacture of the natural graphite particles, performing cold isostatic pressing (CIP) and controlling conditions, or by controlling the amount of a carbon coating layer, specifically, performing cold isostatic pressing (CIP) and controlling conditions.

As used herein, the term "plasticity" refers to a characteristic of an object to be permanently altered in shape even with the removal of external force when the object is altered in external shape due to the external force applied thereto without a change in motion state. Meanwhile, the term "elasticity" refers to a characteristic of an object to return to an original state thereof with the removal of external force when the object is altered in external shape due to the external force applied thereto without a change in motion state, and is a concept distinct from the plasticity. As used herein, the term "particle strength upon plastic deformation" may be defined as particle strength at a point where an object is permanently altered in shape even with the removal of external force when the object is altered in external shape due to the external force applied thereto without a change in motion state. Specifically, when a stress-strain curve is plotted by applying a load to the negative electrode active material in a powder resistance measuring device or the like, it may be defined as an elastic region in a case where stress and strain have a proportional relationship, and it may be defined as a plastic region when only the strain changes without a change in stress, and the particle strength upon plastic deformation may be defined as stress at the point of changing from an elastic region to the plastic region in the stress-strain curve.

The negative electrode active material may have a compressive fracture strength of 350 MPa to 1,000 MPa, preferably 400 MPa to 900 MPa, more preferably 480 MPa to 900 MPa, and even more preferably 650 MPa to 800 MPa. As used herein, the compressive fracture strength may be defined as a maximum compressive stress applied to an object without object breakage. The compressive fracture strength is a concept distinct from "particle strength upon plastic deformation", which measures the particle strength for permanent deformation of the outer shape of an object. When the negative electrode active material according to the present invention has a compressive fracture strength in the range described above, preventing structural deformation of the active material and maintaining the pore structure are maximized, the particle breakage caused by contact of particles is prevented, and accordingly, the output characteristics and lifespan characteristics of the negative electrode may be remarkably improved.

The above-described compressive fracture strength of the negative electrode active material may be implemented by, in the manufacture of the natural graphite particles, performing cold isostatic pressing (CIP) and controlling conditions, or by controlling the amount of a carbon coating layer, specifically, performing cold isostatic pressing (CIP) and controlling conditions.

The negative electrode active material may be spherical. When the negative electrode active material is spherical, the negative electrode active materials effectively maintain a pore structure inside the negative electrode, thereby securing a lithium ion diffusion path and improving output characteristics of the negative electrode. As used herein, the term "spherical" refers to a concept including a substantially spherical shape even when slightly distorted, in addition to a perfect spherical shape.

The negative electrode active material may have an average particle diameter ($D_{50}$) of 10 μm to 25 μm, preferably 15 μm to 20 μm. When the average particle diameter ($D_{50}$) of negative electrode active material is in the above range, it is preferable in terms of improving both output characteristics and lifespan characteristics.

The negative electrode active material may be included in an amount of 80 wt % to 99 wt %, preferably, 88 wt % to 98 wt % in the negative electrode active material layer.

The negative electrode active material layer may further include a binder, a conductive agent, and/or a thickener in addition to the above-described negative electrode active material.

The binder is a component that assists in the binding between the active material and/or the current collector, wherein the binder may commonly be included in an amount of 1 wt % to 30 wt %, preferably, 1 wt % to 10 wt % in the negative electrode active material layer.

The binder may include at least one selected from the group consisting of polyvinylidene fluoride (PVDF), polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated EPDM, a styrene-butadiene rubber, and a fluorine rubber, preferably, at least one selected from polyvinylidene fluoride and a styrene-butadiene rubber.

Any thickener used in a typical lithium secondary battery may be used as the thickener, and an example thereof is carboxymethyl cellulose (CMC).

The conductive agent is a component for further improving the conductivity of the negative electrode active material, wherein the conductive agent may be included in an amount of 1 wt % to 30 wt %, for example, 1 wt % to 10 wt % in the negative electrode active material layer.

Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers or metal fibers; fluorocarbon; metal powder such as aluminum powder, and nickel powder; conductive whiskers such as zinc oxide whiskers and potassium titanate whiskers; conductive metal oxide such as titanium oxide; or polyphenylene derivatives, may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

A negative electrode slurry is prepared by mixing the above-described negative electrode active material and at least one selected from the binder, the conductive agent, and the thickener in a solvent, and the negative electrode active material layer may be prepared by coating the negative electrode current collector with the negative electrode slurry, and rolling and drying the coated negative electrode current collector.

The solvent may include water or an organic solvent, such as N-methyl-2-pyrrolidone (NMP), and may be used in an amount such that desirable viscosity is obtained when the negative electrode active material as well as optionally the binder and the conductive agent are included. For example, the solvent may be included in an amount such that a concentration of a solid content including the negative electrode active material as well as optionally at least one selected from the binder, the thickener, and the conductive agent is in the range of 50 wt % to 95 wt %, preferably, 70 wt % to 90 wt %.

The negative electrode may have a porosity of 20% to 45%, preferably 25% to 35%. When the porosity of the negative electrode is in the above range, it is preferable in terms of improving both lifespan characteristics and output characteristics.

In the present description, the porosity of the negative electrode may be calculated using Equation 1 below.

$$\text{Porosity of negative electrode (\%)} = \{1 - (\text{electrode density of negative electrode}/\text{true density of negative electrode})\} \times 100 \quad \text{[Equation 1]}$$

In Equation 1 above, the true density of the negative electrode is density of a negative electrode active material layer measured when the negative electrode is taken to a predetermined size and pressed with press equipment until the change in thickness of the negative electrode stops, and the electrode density of the negative electrode is density of a negative electrode active material layer measured when the negative electrode is taken to a predetermined size.

The negative electrode may have a pore resistance of 15Ω or less, preferably 3Ω to 14Ω, and more preferably 9.5Ω to 11.5Ω.

The pore resistance may be defined as a resistance value obtained by injecting an electrolyte containing lithium ions into a symmetric cell prepared using the negative electrode as a working electrode and a counter electrode in the same manner, and performing electrochemical impedance spectroscopy (EIS). The pore resistance is EIS-analyzed with the symmetric cell, and thus only lithium ions derived from the electrolyte may be present, and accordingly, the lithium ion diffusion resistance in the negative electrode may be objectively measured.

The negative electrode has pore resistance in the above-described range, and thus, the lithium ion diffusion path may be minimized in the negative electrode, thereby improving the output performance of a battery. In addition, within the above-described pore resistance range, the lithium ion diffusion path may be minimized, Li-plating on a surface that may occur upon high-rate charging may be effectively prevented, and side reactions on the surface of the negative electrode may be prevented. Accordingly, the negative electrode of the present invention having the pore resistance in the above-described range may be improved to an excellent level in output characteristics and lifespan characteristics.

The above-described pore resistance range may be adjusted, for example, by controlling particle strength upon plastic deformation, compressive fracture strength, structure, size, and the like of the negative electrode active material.

Secondary Battery

Furthermore, the present invention provides a secondary battery including the above-described negative electrode, more particularly, a lithium secondary battery.

The secondary battery may include the above-described negative electrode; a positive electrode facing the negative electrode; a separator between the negative electrode and the positive electrode; and an electrolyte.

The positive electrode may include a positive electrode current collector; and a positive electrode active material layer on the positive electrode current collector.

A positive electrode current collector generally used in the art may be used without limitation as the positive electrode current collector, and, for example, the positive electrode current collector is not particularly limited so long as it has high conductivity without causing adverse chemical changes in the secondary battery. For example, the positive electrode current collector may include at least one selected from copper, stainless steel, aluminum, nickel, titanium, fired carbon, and an aluminum-cadmium alloy, preferably, aluminum.

The positive electrode current collector may have fine irregularities on the surface thereof to improve the bonding strength of a positive electrode active material, and the positive electrode current collector may be used in various shapes such as a film, a sheet, a foil, a net, a porous body, a foam body, and a non-woven fabric body.

The positive electrode current collector generally may have a thickness of 3 μm to 500 μm.

The positive electrode active material layer may include a positive electrode active material.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. More specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-z}Ni_zO_4$ (where $0<Z<2$), etc.), lithium-nickel-cobalt-based oxide (e.g., $LiNi_{1-Y1}Co_{Y1}O_2$ (where $0<Y1<1$), etc.), lithium-manganese-cobalt-based oxide (e.g., $LiCo_{1-Y2}Mn_{Y2}O_2$ (where $0<Y2<1$), $LiMn_{2-z1}Co_{z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $O<S2<1$, and $p2+q2+r3+S2=1$), etc.), and any one thereof or a mixture of two or more thereof may be included. Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$), or lithium nickel cobalt aluminum oxide (e.g., $Li(Ni_{0.8}Co_{0.15}Al_{0.05})O_2$, etc.), and, in consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 80 wt % to 99 wt % in the positive electrode active material layer.

The positive electrode active material layer may further include at least one selected from a binder and a conductive agent together with the positive electrode active material.

The binder is a component that assists in the binding between the active material and the conductive agent and in the binding with the current collector, wherein the binder is commonly added in an amount of 1 wt % to 30 wt % based on a total weight of a positive electrode material mixture. Examples of the binder may be at least one selected from the group consisting of polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene terpolymer (EPDM), a sulfonated EPDM, a styrene-butadiene rubber, and a fluorine rubber.

The binder may be included in an amount of 1 wt % to 30 wt % in the positive electrode active material layer.

Any conductive agent may be used without particular limitation so long as it has conductivity without causing adverse chemical changes in the battery, and, for example, a conductive material, such as: graphite; a carbon-based material such as carbon black, acetylene black, Ketjen black, channel black, furnace black, lamp black, and thermal black; conductive fibers such as carbon fibers or metal fibers; fluorocarbon; metal powder such as aluminum powder, and nickel powder; conductive whiskers such as zinc oxide whiskers and potassium titanate whiskers; conductive metal oxide such as titanium oxide; or polyphenylene derivatives, may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The conductive agent may be added in an amount of 1 wt % to 30 wt % in the positive electrode active material layer.

The separator separates the negative electrode and the positive electrode and provides a movement path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be used. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used. In addition, a coated separator including a ceramic component or a polymer component may be used to secure heat resistance or mechanical strength, and the separator having a single layer or multilayer structure may be selectively used.

In addition, the electrolyte used in the present invention may be an organic liquid electrolyte, an inorganic liquid electrolyte, a solid polymer electrolyte, a gel-type polymer electrolyte, a solid inorganic electrolyte, a molten-type inorganic electrolyte, and the like, all of which may be used in the manufacturing of a lithium secondary battery, but is not limited thereto.

Specifically, the electrolyte may include an organic solvent and lithium salt.

Any organic solvent may be used without particular limitation as long as it may serve as a medium through which ions involved in an electrochemical reaction of a battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, a carbonate-based solvent is preferable, and a mixture of a cyclic carbonate (e.g., ethylene carbonate or propylene carbonate) having a high ionic conductivity and a high dielectric constant and a linear carbonate-based compound having a low viscosity (e.g., ethylmethyl carbonate, dimethyl carbonate, or diethyl carbonate), the mixture which may increase charging/discharging performance of a battery, is more preferable. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. When the concentration of the lithium salt is in the above range, the electrolyte has suitable conductivity and viscosity, thereby exhibiting excellent performance, and lithium ions may effectively move.

As described above, since the lithium secondary battery according to the present invention stably exhibits excellent discharge capacity, output characteristics, and life characteristics, the lithium secondary battery is suitable for portable devices, such as mobile phones, notebook computers, and digital cameras, and electric cars such as hybrid electric vehicles (HEV) and particularly, may be preferably used as a constituent battery of a medium- and large-sized battery module. Thus, the present invention also provides a medium- and large-sized battery module including the above-described secondary battery as a unit cell.

The medium- and large-sized battery module may be preferably used in power sources that require high output and large capacity, such as an electric vehicle, a hybrid electric vehicle, and a power storage system.

Hereinafter, embodiments of the present invention will be described in detail to make sure that those skilled in the art easily implement the present invention. However, the present invention may be modified into other various forms, and is not limited to the embodiments described herein.

EXAMPLES

Example 1: Preparation of Negative Electrode (1) Preparation of Negative Electrode Active Material Natural graphite raw materials were collected from graphite ore using floatation, and the natural graphite raw materials were treated with acid or base to remove impurities, and the resulting product was rinsed and dried to prepare flaky natural graphite. The flaky natural graphite obtained above was spherically shaped using a vortex flow pulverizer, and impurities were removed with sulfuric acid, and the obtained was dried to prepare spherical natural graphite.

The spherical natural graphite was filled in a mold, pressed through cold isostatic pressing (CIP), and crushed. The pressure upon the pressing was 90 MPa, and the pressing was performed for 15 minutes.

The pressed spherical natural graphite was mixed with pitch, the mixture was heat-treated in a dry manner in an inert atmosphere at 1,250° C. for 24 hours to form an amorphous carbon coating layer on the spherical natural graphite, thereby preparing a negative electrode active material of Example 1. The amorphous carbon coating layer was included in an amount of 3 wt % in the negative electrode active material.

(2) Preparation of Negative Electrode

The negative electrode active material, Super C65 as a conductive agent, styrene-butadiene rubber as a binder, and carboxymethyl cellulose (CMC) as a thickener were mixed in a weight ratio of 96.6:1.0:1.3:1.1, and water was added thereto to prepare a negative electrode slurry. The negative electrode slurry was applied onto a copper negative electrode current collector, vacuum dried at about 130° C. for 10 hours, and rolled to form a negative electrode active material layer, thereby preparing a negative electrode of Example 1. In this case, the negative electrode was prepared such that a loading of the negative electrode was 3.61 mAh/cm$^2$.

Example 2: Preparation of Negative Electrode (1) Preparation of Negative Electrode Active Material A negative electrode active material of Example 2 was prepared in the same manner as in Example 1, except that pressing pressure was 50 MPa upon pressing by CIP.

(2) Preparation of Negative Electrode

A negative electrode was prepared in the same manner as in Example 1, except that the negative electrode active material prepared above was used.

Example 3: Preparation of Negative Electrode (1) Preparation of Negative Electrode Active Material A negative electrode active material of Example 3 was prepared in the same manner as in Example 1, except that pressing pressure was 175 MPa upon pressing by CIP.

(2) Preparation of Negative Electrode

A negative electrode was prepared in the same manner as in Example 1, except that the negative electrode active material prepared above was used.

Example 4: Preparation of Negative Electrode (1) Preparation of Negative Electrode Active Material A negative electrode active material of Example 4 was prepared in the same manner as in Example 1, except that the weight ratio when spherical natural graphite is mixed with pitch was controlled such that an amorphous carbon coating layer was included in an amount of 10 wt % in the negative electrode active material.

(2) Preparation of Negative Electrode

A negative electrode was prepared in the same manner as in Example 1, except that the negative electrode active material prepared above was used.

Comparative Example 1: Preparation of Negative Electrode (1) Preparation of Negative Electrode Active Material A negative electrode active material of Comparative Example 1 was prepared in the same manner as in Example 1, except that pressing by CIP was not performed.

(2) Preparation of Negative Electrode

A negative electrode was prepared in the same manner as in Example 1, except that the negative electrode active material prepared above was used.

Comparative Example 2: Preparation of Negative Electrode (1) Preparation of Negative Electrode Active Material A negative electrode active material of Comparative Example 2 was prepared in the same manner as in Example 1, except that pressing pressure was 375 MPa upon pressing by CIP.

(2) Preparation of Negative Electrode

A negative electrode was prepared in the same manner as in Example 1, except that the negative electrode active material prepared above was used.

Physical properties of the negative electrodes and negative electrode active materials of Examples 1 to 4 and Comparative Examples 1 and 2 prepared above were evaluated as shown in Table 1 below.

TABLE 1

| | Negative electrode active material | | | Negative electrode | |
|---|---|---|---|---|---|
| | Average particle diameter ($D_{50}$) (μm) | Particle strength upon plastic deformation (MPa) | Compressive fracture strength (MPa) | Pore resistance (Ω) | Porosity (%) |
| Example 1 | 18 | 110 | 720 | 10 | 28 |
| Example 2 | 18 | 45 | 500 | 13 | 28 |
| Example 3 | 18 | 180 | 880 | 9 | 28 |

TABLE 1-continued

| | Negative electrode active material | | | Negative electrode | |
|---|---|---|---|---|---|
| | Average particle diameter ($D_{50}$) (μm) | Particle strength upon plastic deformation (MPa) | Com-pressive fracture strength (MPa) | Pore resistance (Ω) | Porosity (%) |
| Example 4 | 20 | 51 | 420 | 15 | 28 |
| Comparative Example 1 | 18 | 30 | 150 | 18 | 28 |
| Comparative Example 2 | 18 | 220 | 1,200 | 22 | 28 |

Particle strength upon plastic deformation, compressive fracture strength, and rolling density of the negative electrode active material, and pore resistance and porosity of the negative electrode were measured through the following method.

(1) Particle Strength Upon Plastic Deformation

The particle strength upon plastic deformation of the negative electrode active materials of Examples and Comparative Examples was measured using a powder resistance measuring instrument (device name: PI88 SEM Picoindenter, manufacturer: HYSITRON). Specifically, a stress-strain curve was plotted by applying a load to the negative electrode active materials, and particle strength was measured at the point of changing from an elastic region to a plastic region and at the plastic region where only strain was changed without a change in stress.

(2) Compressive Fracture Strength

The compressive fracture strength of the negative electrode active materials of Examples and Comparative Examples was measured using a powder resistance measuring instrument (device name: PI88 SEM Picoindenter, manufacturer: HYSITRON). Specifically, a stress-strain curve was plotted by applying a load to the negative electrode active materials, and a maximum compressive stress applied without destroying the negative electrode active material was measured.

(3) Pore Resistance

The negative electrodes prepared in Examples 1 to 4 and Comparative Examples 1 to 2 were used in the same manner as a working electrode and a counter electrode, and a polyethylene separator was interposed between the working electrode and the counter electrode to prepare an electrode assembly. An electrolyte solution in which 1 M $LiPF_6$ was dissolved in a solvent in which ethylene carbonate (EC) and diethylene carbonate (EMC) were mixed in a volume ratio of 1:4 was injected to the electrode assembly to prepare a symmetric cell.

The symmetric cell was set to have a frequency range of $10^6$ Hz to 0.05 Hz, using an electrochemical impedance analysis device to measure impedance, and electrolyte resistance and pore resistance were separated to measure pore resistance.

(4) Porosity

The porosity of the negative electrodes prepared in Examples 1 to 4 and Comparative Examples 1 to 2 was calculated using Equation 1 below.

$$\text{Porosity of negative electrode (\%)}=\{1-(\text{electrode density of negative electrode}/\text{true density of negative electrode})\}\times 100 \quad \text{[Equation 1]}$$

In Equation 1 above, the true density of the negative electrode is density of a negative electrode active material layer measured when the negative electrode is taken to a predetermined size and pressed with press equipment until the change in thickness of the negative electrode stops, and the electrode density of the negative electrode is density of a negative electrode active material layer measured when the negative electrode is taken to a predetermined size.

EXPERIMENTAL EXAMPLES

<Preparation of Coin Half-Cell>

The negative electrodes prepared in Examples 1 to 4 and Comparative Examples 1 to 2 were punched to the size of a coin cell, and then a polyolefin separator was interposed between the negative electrodes and lithium foils as a counter electrode, and an electrolyte solution in which 1 M $LiPF_6$ was dissolved in a solvent in which ethylene carbonate (EC) and ethylmethyl carbonate (DEC) were mixed in a volume ratio of 50:50, was injected thereby preparing coin half-cells of Examples 1 to 4 and Comparative Examples 1 to 2.

Experimental Example 1: Output Characteristics Evaluation

The coin half-cells of Examples 1 to 4 and Comparative Examples 1 and 2 were cycle charged and discharged at high current to measure capacity retention at 50 cycles, and output characteristics were evaluated.

Specifically, the coin half-cells of Examples 1 to 4 and Comparative Examples 1 and 2 were charged and discharged up to the 50th cycle under the conditions of charging (CC/CV mode, 2C charging, cut-off at 0.005 V and 0.005 C) and discharging (CC mode, 2C discharge, cut-off at 1.5 V). The 50 cycle capacity retention was evaluated through the following Equation, and results are shown in Table 2.

$$\text{Capacity retention rate (\%)}=\{(\text{discharge capacity at 50th cycle})/(\text{discharge capacity in 1st cycle})\}\times 100$$

TABLE 2

| | 50 cycle capacity retention (%) |
|---|---|
| Example 1 | 80 |
| Example 2 | 78 |
| Example 3 | 81 |
| Example 4 | 74 |
| Comparative Example 1 | 69 |
| Comparative Example 2 | 68 |

Referring to Table 2, it is seen that the negative electrodes of Examples 1 to 4 including the negative electrode active material satisfying the particle strength upon plastic deformation of the present invention have superior output characteristics and lifespan characteristics to the negative electrodes of Comparative Examples.

Experimental Example 2: High Temperature Storage Characteristics

In the coin half-cells of Examples 1 to 3 and Comparative Examples 1 and 2, the coin half-cells were charged to a SOC of 95%, and stored at high temperature (60° C.) for 4 weeks, and the residual capacity retention (%) thereof was measured according to the following method and shown in Table 3 below.

<Residual Capacity Retention (%)>

The lithium secondary battery stored at high temperature for 4 weeks was set at room temperature, and then charged/discharged at 0.1 C for 3 cycles and discharged by a SOC of 5% upon the 3rd cycle discharge to obtain discharge capacity. The residual capacity retention was calculated as ratio (%) of discharge capacity to charge capacity of an initial SOC of 95%.

TABLE 3

| | Residual Capacity retention (%) |
|---|---|
| Example 1 | 93 |
| Example 2 | 93 |
| Example 3 | 91 |
| Comparative Example 1 | 88 |
| Comparative Example 2 | 78 |

Referring to Table 3, it is confirmed that the negative electrodes of Examples 1 to 3 including the negative electrode active material satisfying the particle strength upon plastic deformation of the present invention have superior high-temperature storage performance to the negative electrodes of Comparative Examples.

The invention claimed is:

1. A negative electrode comprising:

a negative electrode current collector; and a negative electrode active material layer on at least one surface of the negative electrode current collector, wherein the negative electrode active material layer comprises a negative electrode active material, wherein the negative electrode active material comprises natural graphite particles, the negative electrode active material further comprises a carbon coating layer on a surface of the natural graphite particles, the carbon coating layer is present in an amount of 2 wt % to 5 wt % in the negative electrode active material, the carbon coating layer comprises amorphous carbon, the negative electrode active material has an average particle diameter ($D_{50}$) of 18 um to 20 um, the negative electrode active material has a particle strength of 45 MPa to 180 MPa when being plastically deformed, and the negative electrode active material has a compressive fracture strength of 420 MPa to 880 MPa.

2. The negative electrode of claim 1, wherein the negative electrode active material is spherical.

3. The negative electrode of claim 1, wherein the negative electrode has a pore resistance of 15 22 or less.

4. The negative electrode of claim 1, wherein the negative electrode active material layer has a porosity of 20% to 45%.

5. A secondary battery comprising:

a negative electrode according to claim 1;

a positive electrode facing the negative electrode;

a separator between the negative electrode and the positive electrode; and an electrolyte.

* * * * *